United States Patent
Nakama

(10) Patent No.: US 11,815,432 B2
(45) Date of Patent: Nov. 14, 2023

(54) THERMAL CONDUCTIVITY DETECTOR AND GAS CHROMATOGRAPH INCLUDING SAME

(71) Applicant: SHIMADZU CORPORATION, Kyoto (JP)

(72) Inventor: Yuji Nakama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 463 days.

(21) Appl. No.: 17/273,442

(22) PCT Filed: Jul. 18, 2019

(86) PCT No.: PCT/JP2019/028336
§ 371 (c)(1),
(2) Date: Mar. 4, 2021

(87) PCT Pub. No.: WO2020/059279
PCT Pub. Date: Mar. 26, 2020

(65) Prior Publication Data
US 2021/0341438 A1 Nov. 4, 2021

(30) Foreign Application Priority Data
Sep. 21, 2018 (JP) .................................. 2018-177177

(51) Int. Cl.
*G01N 30/66* (2006.01)
*G01N 30/12* (2006.01)
*G01N 30/02* (2006.01)

(52) U.S. Cl.
CPC .............. *G01N 30/66* (2013.01); *G01N 30/12* (2013.01); *G01N 2030/025* (2013.01); *G01N 2030/126* (2013.01)

(58) Field of Classification Search
CPC ........................................................ G01N 30/66
See application file for complete search history.

(56) References Cited

U.S. PATENT DOCUMENTS
7,185,527 B2  3/2007 Lin

FOREIGN PATENT DOCUMENTS
JP  07-043356 A  2/1995

OTHER PUBLICATIONS

International Search Report for PCT/JP2019/028336 dated Oct. 15, 2019 (PCT/ISA/210).
Written Opinion of the International Searching Authority for PCT/JP2019/028336 dated Oct. 15, 2019 (PCT/ISA/237).

*Primary Examiner* — Jamel E Williams
*Assistant Examiner* — Alex T Devito
(74) *Attorney, Agent, or Firm* — Sughrue Mion, PLLC

(57) ABSTRACT

A thermal conductivity detector includes a first pipe path that houses a filament, a second pipe path and a third pipe path that connects the first pipe path to the second pipe path. In the third pipe path, first, second and third gas lead-in portions are arranged in this order from the first pipe path toward the second pipe path. A carrier gas is led to the first and third gas lead-in portions alternately, and a sample gas is led to the second gas lead-in portion. The distance between the second and third gas lead-in portions is equal to or smaller than 1.3 times of a maximum dimension of an opening formed at the second gas lead-in portion. At least part of the third pipe path between the second gas lead-in portion and the third gas lead-in portion has a cross sectional area that is equal to or smaller than an area of the opening formed at the second gas lead-in portion.

4 Claims, 8 Drawing Sheets

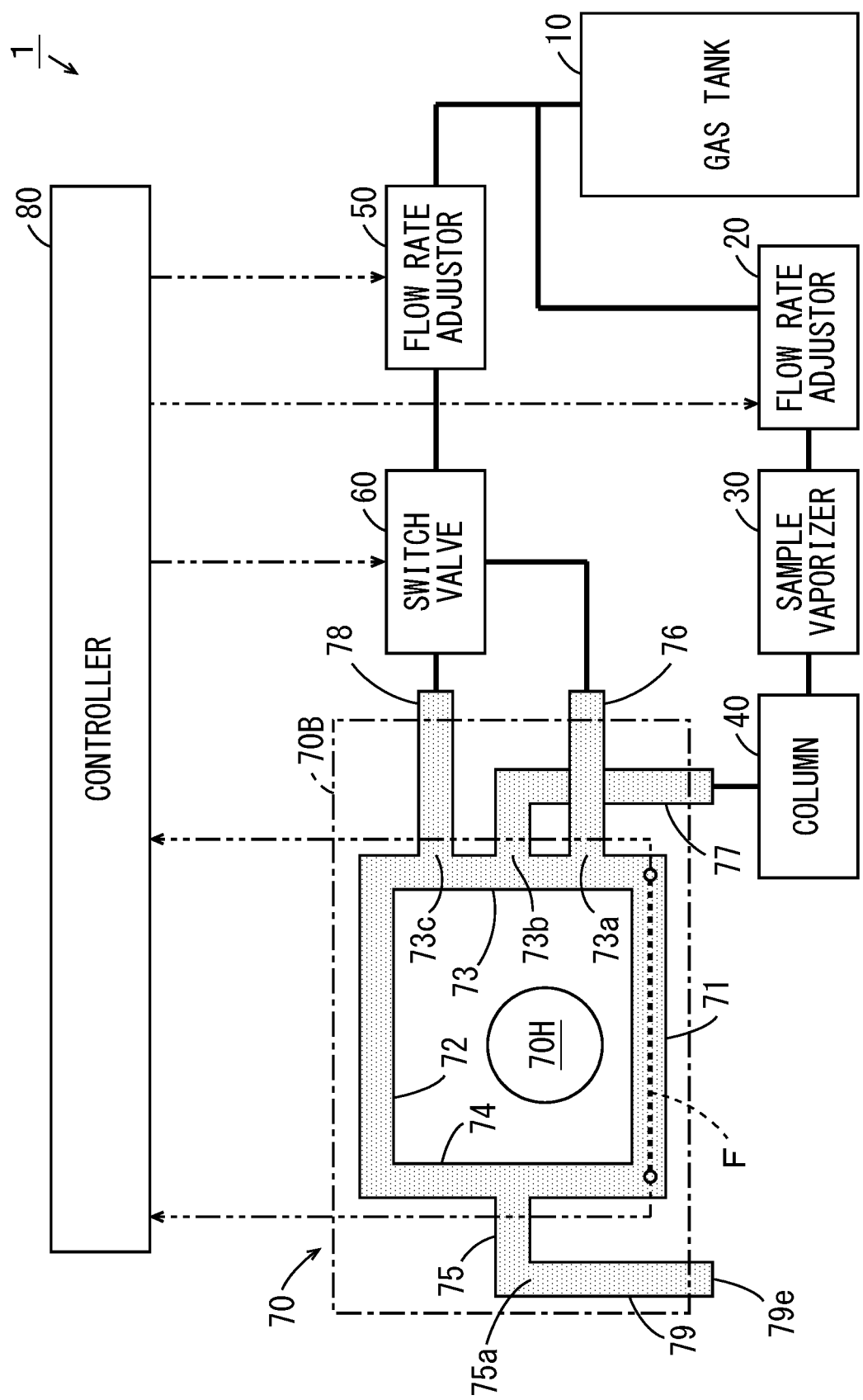
F I G. 1

F I G. 2
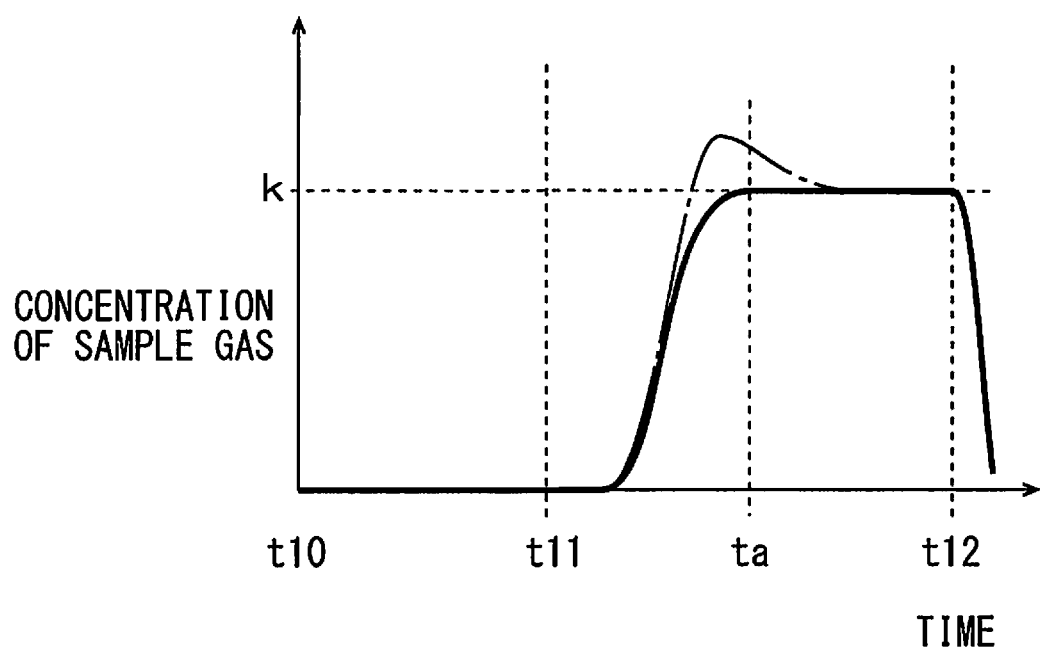

THERMAL CONDUCTIVITY DETECTOR AND GAS CHROMATOGRAPH INCLUDING SAME

CROSS REFERENCE TO RELATED APPLICATIONS

This application is a National Stage of International Application No. PCT/JP2019/028336 filed Jul. 18, 2019, claiming priority based Japanese Patent Application No. 2018-177177 filed Sep. 21, 2018.

TECHNICAL FIELD

The present invention relates to a thermal conductivity detector for a gas chromatograph and the gas chromatograph including the thermal conductivity detector.

BACKGROUND ART

In a gas chromatograph, a thermal conductivity detector is used to analyze a sample, for example. The thermal conductivity detector described in Patent Document 1 includes one cavity in which a filament is arranged. With the filament heated to a certain temperature, a sample gas and a reference gas are led into the cavity alternately.

At this time, the filament loses heat due to the thermal conduction of the led gas, and a resistance value of the filament changes. As such, a chromatogram of the sample gas can be obtained based on the difference between a resistance value of the filament in a case where the sample gas flows through the cavity and a resistance value of the filament in a case where the reference gas flows through the cavity.

[Patent Document 1] US 7,185,527 B2

SUMMARY OF INVENTION

Technical Problem

In a conventional gas chromatograph including the thermal conductivity detector described in Patent Document 1, the concentration of the sample gas to be analyzed is restricted to be in a predetermined range in order to obtain a chromatograph with pre-allowed accuracy.

An object of the present invention is to provide a thermal conductivity detector and a gas chromatograph including the thermal conductivity detector, that can obtain a chromatogram of a sample gas with high accuracy over a wide range of concentration.

Solution to Problem (1) A thermal conductivity detector according to one aspect of the present invention for a gas chromatograph includes a heat generator that is driven to maintain a certain temperature and in which a resistive value changes in accordance with thermal conductivity of a gas flowing around the heat generator, a first flow path that houses the heat generator, and a second flow path and a third flow path that connects the first flow path to the second flow path, wherein first and third openings to which a carrier gas is led alternately and a second opening to which a sample gas is led are formed at the third flow path, the first opening, the second opening and the third opening are provided to be arranged in this order from the first flow path toward the second flow path, a distance between the second and third openings in the third flow path is equal to or smaller than 1.3 times of a maximum dimension of the second opening, and at least part of a portion between the second opening and the third opening of the third flow path has a cross sectional area equal to or smaller than an area of the second opening.

In the thermal conductivity detector, with the sample gas led to the second opening of the third flow path, the carrier gas is alternately led to the first and third openings. When the carrier gas is led to the first opening, the pressure in the space closer to the first flow path than the second opening is increased. Thus, the sample gas led to the second opening flows through the second flow path together with part of the carrier gas. Further, the rest of the carrier gas flows through the first flow path.

Meanwhile, when the carrier gas is led to the third opening, the pressure in the space closer to the second flow path than the second opening is increased. Thus, the sample gas led to the second opening flows through the first flow path together with part of the carrier gas. Further, the rest of the carrier gas flows through the second flow path.

It is possible to detect the components of the sample and their amounts based on a difference between the resistance value of the heat generator when the carrier gas travels around the heat generator and the resistance value of the heat generator when the sample gas travels around the heat generator.

In the third flow path, the distance between the second and third openings is equal to or smaller than 1.3 times of the maximum dimension of the second opening, and at least part of the portion between the second opening and the third opening of the third flow path has a cross sectional area equal to or smaller than an area of the second opening.

With this configuration, an amount of the sample gas present in the space from the second opening to the third opening at a point in time at which a state where the carrier gas is led to the first opening switches to a state where the carrier gas is led to the third opening is reduced. Thus, regardless of the concentration of the sample gas, the magnitude of overshoot in which the concentration of the sample gas flowing around the heat generator increases to exceed a value corresponding to the concentration of the sample gas led to the second opening can be reduced.

In this case, the concentration of the sample gas flowing around the heat generator converges at a value corresponding to the concentration of the sample gas led to the second opening in a short period of time after the carrier gas is started to be led to the third opening. Therefore, a large amount of highly credible data that corresponds to the resistance value of the heat generator can be acquired after the carrier gas is started to be led to the third opening. Therefore, a change amount of the resistance value of the heat generator can be measured each time the sample gas and the carrier gas flow through the first flow path. As a result, a chromatogram of the sample gas can be obtained with high accuracy over a wide range of concentration.

(2) The thermal conductivity detector may further include a sample gas supply pipe that is provided to extend in a direction that intersects with the third flow path and leads a sample gas into the third flow path through the second opening, wherein a dimension of the third flow path in a direction in which the sample gas supply pipe extends may be equal to or smaller than 0.5 mm.

In this case, in the third flow path, the sample gas led to the second opening from the sample gas supply pipe is dispersed in the third flow path by colliding with an inner surface opposite to the second opening. Thus, the stay of the sample gas in the second opening and its vicinity is suppressed. Therefore, the amount of the sample gas present in the space from the second opening to the third opening at a point in time at which a state where the carrier gas is led to the first opening switches to a state where the carrier gas is led to the third opening is reduced.

(3) A gas chromatograph according to another aspect of the present invention includes a sample vaporizer that generates a sample gas by vaporizing a sample, a column that separates the sample gas generated by the sample vaporizer into components and the above-mentioned thermal conductivity detector, wherein the thermal conductivity detector detects thermal conductivity of a sample gas of each of the components into which the sample gas is separated by the column.

This gas chromatograph includes the above-mentioned thermal conductivity detector. Therefore, a gas chromatogram of the sample gas can be obtained with high accuracy over a wide range of concentration.

Advantageous Effects of Invention

With the present invention, a chromatogram of the sample gas can be obtained with high accuracy over a wide range of concentration.

BRIEF DESCRIPTION OF THE DRAWINGS

FIG. 1 is a block diagram showing the configuration of a gas chromatograph according to one embodiment of the present invention.

FIG. 2 is a diagram showing one example of a change in concentration of a sample gas flowing around a filament when a switching valve switches from a first state to a second state.

DESCRIPTION OF EMBODIMENTS

Figure 3:
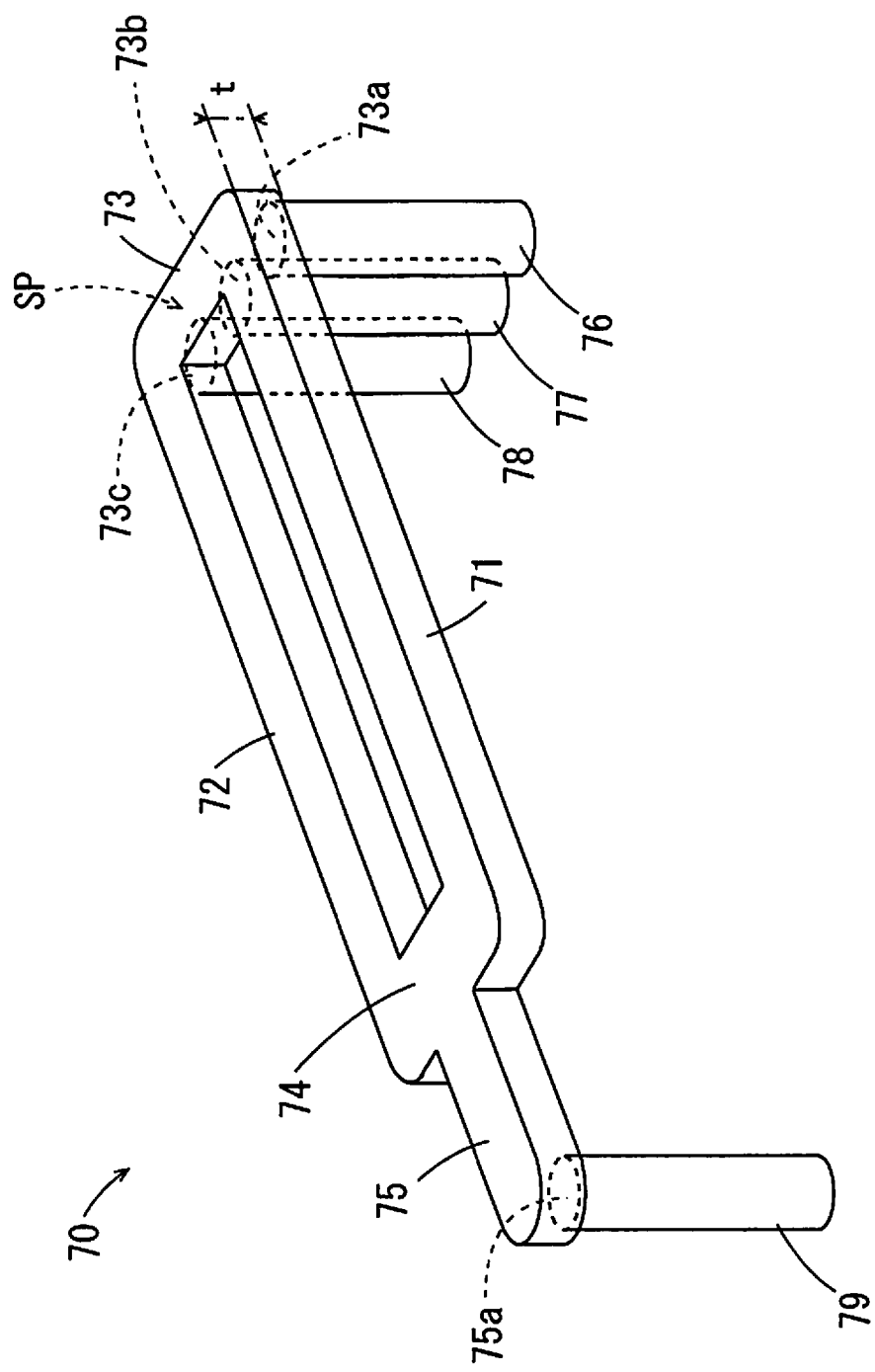
FIG. 3 is an external perspective view for explaining the structure of a plurality of pipe paths of a thermal conductivity detector according to the one embodiment of the present invention.

A thermal conductivity detector and a gas chromatograph including the thermal conductivity detector according to one embodiment of the present invention will be described below with reference to the drawings.

(1) Outline of Configuration and Basic Operation of Gas Chromatograph

FIG. 1 is a block diagram showing the configuration of the gas chromatograph according to the one embodiment of the present invention. As shown in FIG. 1, the gas chromatograph 1 according to the present embodiment mainly includes a gas tank 10, a flow rate adjustor 20, a sample vaporizer 30, a column 40, a flow rate adjustor 50, a switching valve 60, the thermal conductivity detector 70 and a controller 80.

In the gas tank 10, a carrier gas for guiding a sample gas, described below, to the column 40 and the thermal conductivity detector 70 is stored. As the carrier gas, an inert gas such as a helium gas is used.

The gas tank 10 supplies the carrier gas to the two flow rate adjustors 20, 50 through a branch pipe path. The one flow rate adjustor 20 supplies the carrier gas at a predetermined flow rate to the sample vaporizer 30 based on the control of the controller 80.

The sample vaporizer 30 includes an injector and a vaporization chamber. A sample is injected into the vaporization chamber of the sample vaporizer 30 through the injector. An atmosphere in the vaporization chamber is maintained in a state in which the sample is vaporized. Thus, the sample injected into the vaporization chamber is vaporized inside thereof. The sample vaporizer 30 supplies the vaporized sample to the column 40 while mixing the vaporized sample with the carrier gas supplied from the flow rate adjustor 20. In the following description, gases including components of the sample vaporized in the sample vaporizer 30 are collectively referred to as a sample gas.

The column 40 is housed in a column oven (not shown). In the column 40, components of the sample gas supplied from the sample vaporizer 30 are separated. The column 40 supplies the sample gas separated into components to a sample lead-in pipe path 77, described below, of the thermal conductivity detector 70.

The other flow rate adjustor 50 supplies the carrier gas at a predetermined flow rate to the switching valve 60 based on the control of the controller 80. The switching valve 60 is a three-way electromagnetic valve, for example, and is connected to the flow rate adjustor 50 and is connected to two carrier gas lead-in pipe paths 76, 78, described below, of the thermal conductivity detector 70. The flow rate adjustor 50 supplies the carrier gas supplied from the flow rate adjustor 50 to either one of the carrier gas lead-in pipe paths 76, 78 based on the control of the controller 80.

As the configuration for supplying the carrier gas that passes through the flow rate adjustor 50 to either one of the two carrier gas lead-in pipe paths 76, 78, a switching mechanism including a plurality of control valves and a branch pipe path may be used instead of the switching valve 60. For example, a main pipe path is connected to the flow rate adjustor 50, and two sub-pipe paths are respectively connected to the carrier gas lead-in pipe paths 76, 78. Further, two control valves are respectively provided at the two sub-pipe paths. In this case, it is possible to supply the carrier gas supplied from the flow rate adjustor 50 selectively to either one of the two carrier gas lead-in pipe paths 76, 78 of the thermal conductivity detector 70 by controlling open and close states of the two control valves.

The thermal conductivity detector 70 according to the present embodiment includes a first pipe path 71, a second pipe path 72, a third pipe path 73, a fourth pipe path 74, a fifth pipe path 75, the carrier gas lead-in pipe paths 76, 78, the sample lead-in pipe path 77 and an exhaust pipe path 79 that extend linearly and respectively. The plurality of pipe paths are formed of metallic pipes, for example. Further, the first to fourth pipe paths 71 to 74 out of the plurality of pipe paths of the thermal conductivity detector 70 are housed in a cell block 70B together with a heating device 70H. The cell block 70B is fabricated by processing and joining of a plurality of metallic plate-shape members to one another.

The first pipe path 71 and the second pipe path 72 are formed to be opposite to each other and extend in parallel to each other. The third pipe path 73 is formed to connect one end of the first pipe path 71 to one end of the second pipe path 72, and the fourth pipe path 74 is formed to connect the other end of the first pipe path 71 to the other end of the second pipe path 72. The fifth pipe path 75 is formed to extend sidewardly of the fourth pipe path 74 from substantially the center portion of the fourth pipe path 74. A filament F is housed inside of the first pipe path 71. On the other hand, a filament F is not housed inside of the second pipe path 72.

The first pipe path 71 is an example of a first flow path, the second pipe path 72 is an example of a second flow path and the third pipe path 73 is an example of a third flow path. Further, the filament F is an example of a heat generator.

In the third pipe path 73, a first gas lead-in portion 73a, a second gas lead-in portion 73b and a third gas lead-in portion 73c are provided to be arranged in this order. A circular opening is formed at each of the first to third gas lead-in portions 73a to 73c. Out of the first to third gas lead-in portions 73a to 73c, the first gas lead-in portion 73a is the closest to the first pipe path 71, and the third gas lead-in portion 73c is the closest to the third pipe path 73.

The opening of the first gas lead-in portion 73a is an example of a first opening, the opening of the second gas lead-in portion 73b is an example of a second opening and the opening of the third gas lead-in portion 73c is an example of a third opening.

The carrier gas lead-in pipe path 76 is formed to extend from the first gas lead-in portion 73a to the outside of the cell block 70B. The sample lead-in pipe path 77 is formed to extend from the second gas lead-in portion 73b to the outside of the cell block 70B. The carrier gas lead-in pipe path 78 is formed to extend from the third gas lead-in portion 73c to the outside of the cell block 70B.

A gas lead-out portion 75a is provided at the end of the fifth pipe path 75. A circular opening is formed at the gas lead-out portion 75a. The exhaust pipe path 79 is formed to extend from the gas lead-out portion 75a to the outside of the cell block 70B. The exhaust pipe path 79 has an exhaust port 79e outside of the cell block 70B.

The heating device 70H is controlled by the controller 80 and maintains the space in the cell block 70B at a temperature substantially equal to the temperature in the vaporization chamber of the sample vaporizer 30 or the temperature in a column oven housing the column 40. As the heating device 70H, a cartridge heater is used, for example.

The controller 80 is constituted by a CPU (Central Processing Unit) and a memory, or a microcomputer, for example, and controls the operation of each constituent element of the gas chromatograph 1 as described above. Further, the controller 80 of the present example further includes a drive circuit for driving the filament F and a detection circuit for detecting a change in resistance of the filament F.

The above-mentioned switching valve 60 is switched between a first state and a second state in a predetermined period (about 100 msec, for example), the first state being the state where the carrier gas is supplied to the one carrier gas lead-in pipe path 76, and the second state being the state where the carrier gas is supplied to the other carrier gas lead-in pipe path 78.

In this case, in the third pipe path 73 of the thermal conductivity detector 70, when the switching valve 60 is in the first state, the pressure in the space closer to the first gas lead-in portion 73a than the second gas lead-in portion 73b is increased. Thus, the sample gas supplied to the sample lead-in pipe path 77 flows through the second pipe path 72 together with part of the carrier gas that is led from the first gas lead-in portion 73c. Further, the rest of the carrier gas that is led from the first gas lead-in portion 73a flows through the first pipe path 71 as a reference gas.

On the other hand, in the third pipe path 73 of the thermal conductivity detector 70, when the switching valve 60 is in the second state, the pressure in the space closer to the third gas lead-in portion 73c than the second gas lead-in portion 73b is increased. Thus, the sample gas supplied to the sample lead-in pipe path 77 flows through the first pipe path 71 together with part of the carrier gas that is led from the third gas lead-in portion 73c. Further, the rest of the carrier gas led from the third gas lead-in portion 73c flows through the second pipe path 72.

Thus, in the controller 80, a chromatogram of the sample gas can be obtained based on a change amount of a resistance value of the filament F between the time when the reference gas travels around the filament F and the time when the sample gas travels around the filament F.

(2) Analysis of Sample Gas

In order to obtain a chromatogram of the sample gas, it is necessary to acquire data (hereinafter referred to reference data) representing a resistance value of the filament F when the reference gas travels around the filament F each time the switching valve 60 is switched to the first state as described above. Further, it is necessary to acquire data (hereinafter referred to as sample data) representing a resistance value of the filament F when the reference gas travels around the filament F each time the switching valve 60 is switched to the second state.

The change amount of the resistance value of the filament F corresponding to the time when the reference data and the sample data are acquired can be calculated based on the reference data and the sample data that are acquired successively. Therefore, in a case where the switching valve 60 switches between the first state and the second state in a period of 100 msec, for example, the change amount of the resistance value of the filament F can be calculated every 200 msec.

The level of an electric signal corresponding to the resistance value of the filament F is measured in a small sampling period when the switching valve 60 is in the first state, for example, and the average of a plurality of acquired measurement values is obtained. Thus, the above-mentioned reference data is calculated. Further, the level of an electric signal corresponding to the resistance value of the filament F is measured in a small sampling period when the switching valve 60 is in the second state, for example, and the average of a plurality of acquired measurement values is obtained. Thus, the sample data is calculated. The more sampling is performed, the higher an SN ratio (Signal-to-Noise ratio) of each of the reference data and the sample data is.

Here, the resistance value of the filament F changes in accordance with the concentration of gas flowing around the filament F. Therefore, the level of an electric signal corresponding to the resistance value of the filament F is desirably sampled with the concentration of gas flowing around the filament F stabilized.

FIG. 2 is a diagram showing one example of a change in concentration of the sample gas flowing around the filament F when the switching valve 60 switches from the first state to the second state. In FIG. 2, the abscissa indicates the time, and the ordinate indicates the concentration of the sample gas. One example of the change in concentration of the sample gas is indicated by the thick solid line. In the present example, the switching valve 60 is in the first state at a point t10 in time. Thereafter, the switching valve 60 is switched to the second state at a point t11 in time, and the switching valve 60 is further switched to the first state at a point t12 in time.

Only the carrier gas flows around the filament F from the point t10 to the point t11 in time. Therefore, the concentration of the sample gas is maintained at 0. Right after the switching valve 60 is switched from the first state to the second state at the point t11 in time, the sample gas is not present around the filament F. Therefore, the concentration of the sample gas continues to be maintained at 0 from the point t11 in time until the sample gas enters the first pipe path 71 (FIG. 1).

Thereafter, the sample gas enters the first pipe path 71, so that the concentration of the sample gas rises from 0. Further, the sample gas and the carrier gas are led to the first pipe path 71, and the mixture ratio between the sample gas and the carrier gas is stabilized. Therefore, the concentration of the sample gas is maintained at a value k corresponding to the concentration of the sample gas led to the third pipe path 73 (FIG. 1) at an intermediate point to in time between the points t11, t12 in time and later.

Therefore, in the example of FIG. 2, the level of an electrical signal corresponding to the resistance value of the filament F is desirably sampled from the intermediate point to in time to the point t12 in time when the concentration of gas flowing around the filament F is stabilized.

However, when the switching valve 60 actually switches to the second state, the concentration of the sample gas flowing around the filament F may increase to exceed the above-mentioned value k, and overshoot may occur as indicated by the one-dot and dash line in FIG. 2. The higher the concentration of the sample gas led to the third pipe path 73 is, the higher the magnitude of the overshoot is.

When the magnitude of overshoot increases, a period of time during which the switching valve 60 is in the second state and the concentration of gas flowing around the filament F is stabilized is shortened. Therefore, in a case where a working period of the switching valve 60 is defined in advance, and also in a case where sampling is performed except for the time when overshoot occurs, the required number of times sampling is performed to increase the SN ratio cannot be ensured.

Meanwhile, a method of increasing an amount of the carrier gas to be supplied to the third pipe path 73 and increasing a flow rate of the sample gas flowing around the filament F is considered to shorten the period of time during which overshoot occurs. However, with this method, the sample gas flowing from the third pipe path 73 to the first pipe path 71 is diluted by a large amount of the carrier gas. Therefore, the concentration of the sample gas flowing around the filament F is markedly reduced, and the SN ratio of the sample data is reduced.

As such, in the thermal conductivity detector 70 according to the present embodiment, the structure of the third pipe path 73 is set such that the magnitude of overshoot that occurs when the switching valve 60 switches from the first state to the second state is reduced.

(3) Structure of Each Pipe Path That Constitutes Thermal Conductivity Detector 70

Figure 4:
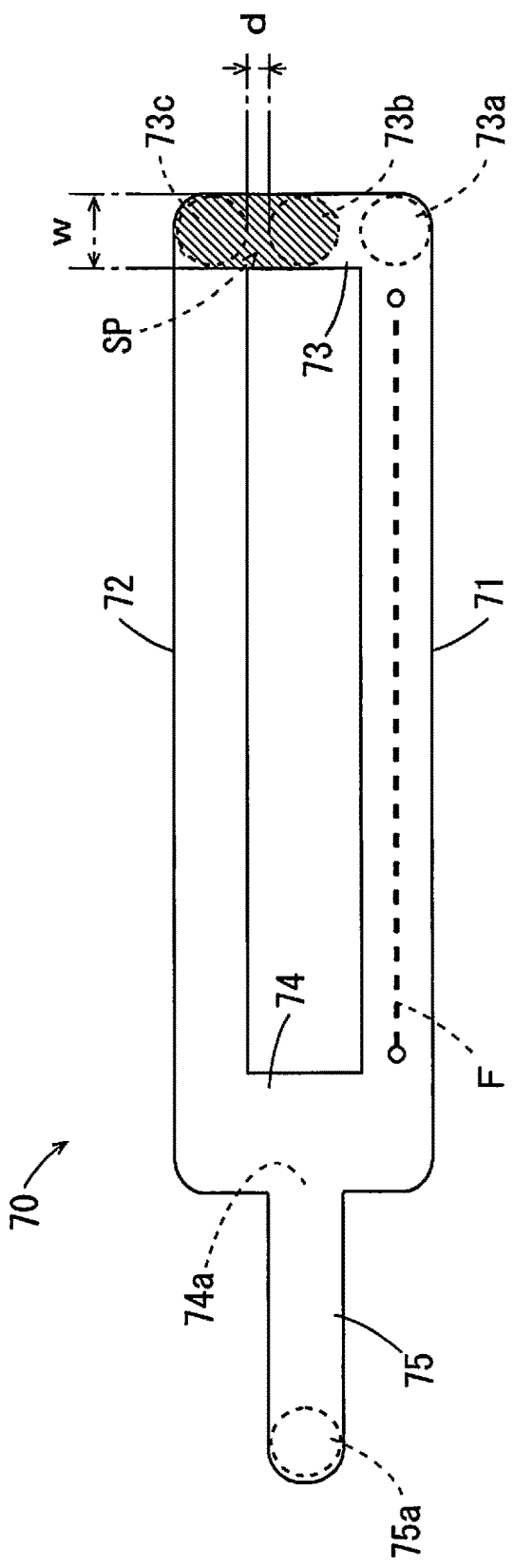
FIG. 4 is a plan view of the plurality of pipe paths of FIG. 3.

FIG. 3 is an external perspective view for explaining the structure of a plurality of pipe paths of the thermal conductivity detector 70 according to the one embodiment of the present invention, and FIG. 4 is a plan view of the plurality of pipe paths of FIG. 3.

As shown in FIG. 3, in the thermal conductivity detector 70 of the present example, the carrier gas lead-in pipe paths 76, 78, the sample lead-in pipe path 77 and the exhaust pipe path 79 are formed of cylindrical pipes having a circular cross section. Each cylindrical pipe has an outer diameter of about 1.0 mm to 1.5 mm, for example. On the other hand, the first to fifth pipe paths 71 to 75 are formed of square pipes having a rectangular cross section and are positioned on a common virtual plane. The long side and the short side of the rectangular cross section of each square pipe has the length of about 0.5 mm to 2.0 mm, for example.

The carrier gas lead-in pipe path 76, the sample lead-in pipe path 77 and the carrier gas lead-in pipe path 78 are connected to the first gas lead-in portion 73a, the second gas lead-in portion 73b and the third gas lead-in portion 73c to extend in a direction orthogonal to the third pipe path 73.

Here, the above-mentioned overshoot is considered to depend on an amount of the sample gas present in the space SP from the second gas lead-in portion 73b to the third gas lead-in portion 73c in the third pipe path 73 at a point in time at which the switching valve 60 switches from the first state to the second state. In FIG. 4, the space SP from the second gas lead-in portion 73b to the third gas lead-in portion 73c is indicated by hatching.

As such, in the present embodiment, a distance d (see FIG. 4) between the second gas lead-in portion 73b and the third gas lead-in portion 73c in the third pipe path 73 is set equal to or smaller than 1.3 times of the maximum dimension of the opening of the second gas lead-in portion 73b as a first condition.

The above-mentioned distance d is preferably equal to or smaller than 0.5 times of the maximum dimension of the opening of the second gas lead-in portion 73b and is more preferably equal to or smaller than 0.3 times of the maximum dimension of the opening of the second gas lead-in portion 73b.

A circular opening is formed at the second gas lead-in portion 73b. Therefore, the maximum dimension of the opening is the inner diameter of the opening. Not circular but polygonal or oval opening may be formed at the second gas lead-in portion 73b. In a case where the shape of opening is polygonal, the maximum dimension of the opening is the length of the largest diagonal among a plurality of diagonals of a polygon. In a case where the shape of opening is oval, the maximum dimension of the opening is the length of a long axis.

Further, as the second condition, at least part of the portion between the second gas lead-in portion 73b and the third gas lead-in portion 73c of the third pipe path 73 is set to have a cross sectional area that is equal to or smaller than an area of the opening formed at the second gas lead-in portion 73b.

The third pipe path 73 of the thermal conductivity detector 70 is configured to satisfy the first and second conditions, whereby the magnitude of overshoot of the concentration of the sample gas that occurs when the switching valve 60 switches from the first state to the second state can be reduced.

The third pipe path 73 preferably has the thickness t (see FIG. 3) equal to or smaller than 0.5 mm in a direction in which the sample lead-in pipe path 77 extends. In this case, in the third pipe path 73, the sample gas led from the sample lead-in pipe path 77 to the second gas lead-in portion 73b is dispersed in the third pipe path 73 by colliding with the inner surface opposite to the second gas lead-in portion 73b. Thus, the stay of the sample gas in the second gas lead-in portion 73b and its vicinity is suppressed. Therefore, the amount of the sample gas present in the space SP from the second gas lead-in portion 73b to the third gas lead-in portion 73c when the switching valve 60 switches from the first state to the second state is more sufficiently reduced.

Further, in the thermal conductivity detector 70 according to the present embodiment, the third pipe path 73 preferably has a width w (see FIG. 4) that is equal to or smaller than the maximum dimension of the opening of the second gas lead-in portion 73b in a direction that is orthogonal to the direction in which the third pipe path 73 extends and orthogonal to the direction in which the sample lead-in pipe path 77 extends. In the example of FIGS. 3 and 4, the width w of the third pipe path 73 is equal to the maximum dimension of the opening of the second gas lead-in portion 73b. Thus, the space SP from the second gas lead-in portion 73b to the third gas lead-in portion 73c in the third pipe path 73 is made compact sufficiently.

The cross sectional area from the second gas lead-in portion 73b to the third gas lead-in portion 73c in the third pipe path 73 of FIGS. 3 and 4 is formed to be constant in the direction in which the third pipe path 73 extends. The cross sectional area from the second gas lead-in portion 73b to the third gas lead-in portion 73c in the third pipe path 73 is not limited to this example and may be formed to change in the direction in which the third pipe path 73 extends. For example, a narrow portion having a cross sectional area smaller than those of the other portions may be formed locally between the second gas lead-in portion 73b and the third gas lead-in portion 73c in the third pipe path 73.

(4) Inventive Example and Comparative Example

The inventors of the present invention used the thermal conductivity detector 70 having the structure of FIG. 3 for an inventive example, used a conventional thermal conductivity detector, described below, for a comparative example, and carried out simulation in regard to the concentration of a sample gas that travels around a filament F in a thermal conductivity detector of each example.

Suppose that the sample gas having a predetermined concentration is led to a third pipe path 73 in a gas chromatograph 1 including the thermal conductivity detector of each example, specifically. In addition, overshoot of concentration of the sample gas that occurs in a space around a filament F in the thermal conductivity detector of each example due to the switch of a switching valve 60 was obtained by simulation.

In the thermal conductivity detector 70 of the inventive example, the distance d between the second gas lead-in portion 73b and the third gas lead-in portion 73c in the third pipe path 73 is 0.2 times of the maximum dimension of the opening of the second gas lead-in portion 73b. Further, the minimum cross sectional area between the second gas lead-in portion 73b and the third gas lead-in portion 73c in the third pipe path 73 of the inventive example is 0.6 times of the area of the opening formed at the second gas lead-in portion 73b.

Figure 5:
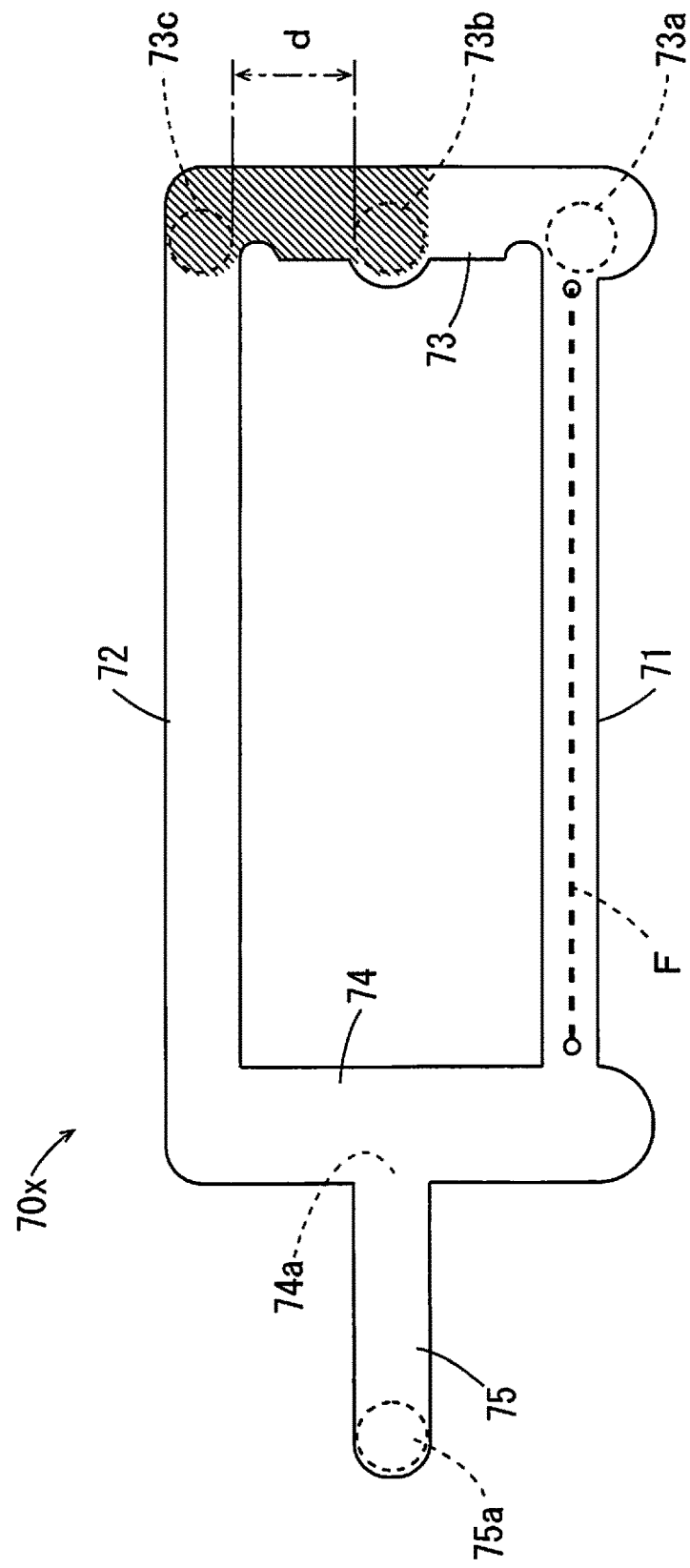
FIG. 5 is a plan view for explaining the shapes and dimensions of the plurality of pipe paths of a conventional conductivity detector according to a comparative example.

The thermal conductivity detector of the comparative example will be described. FIG. 5 is a plan view for explaining the shape and dimension of a plurality of pipe paths of the conventional thermal conductivity detector according to the comparative example. The thermal conductivity detector 70x of the comparative example basically has the same configuration as that of the thermal conductivity detector 70 of the inventive example except that the structure of a third pipe path 73 is different.

In the thermal conductivity detector 70x of the comparative example, the distance d between a second gas lead-in portion 73b and a third gas lead-in portion 73c in the third pipe path 73 is 1.5 times of the maximum dimension of an opening of the second gas lead-in portion 73b. Further, the minimum cross sectional area between the second gas lead-in portion 73b and the third gas lead-in portion 73c in the third pipe path 73 of the comparative example is 0.75 times of the area of the opening formed at the second gas lead-in portion 73b.

Figure 6A:
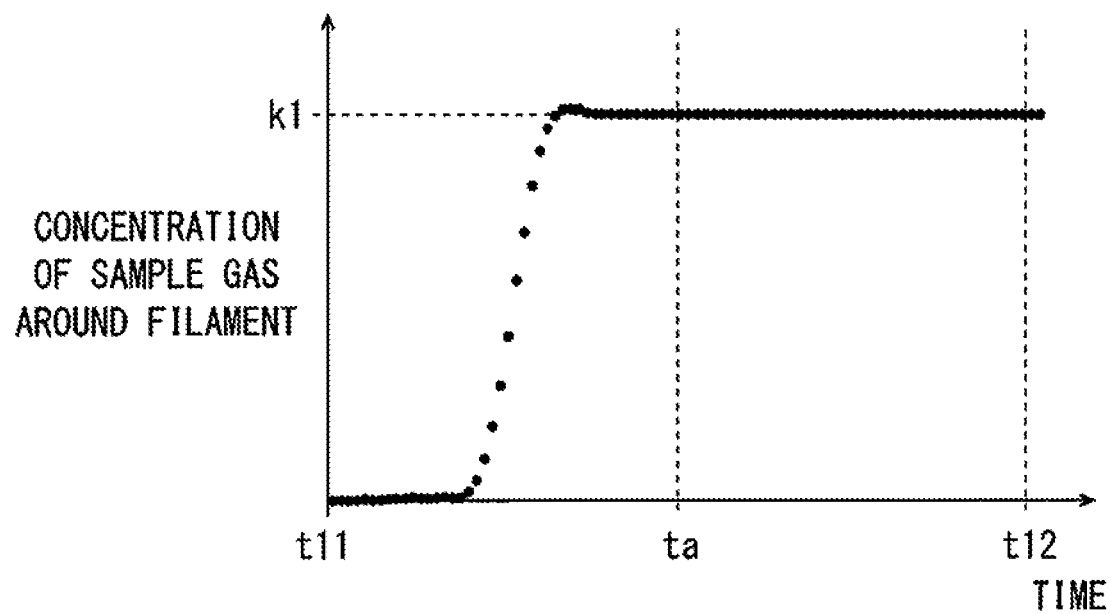
FIGS. 6A and 6B are diagrams showing a result of simulation in regard to the concentration of a sample gas passing through a space around the filament in thermal conductivity detectors of an inventive example and the comparative example.
Figure 6B:
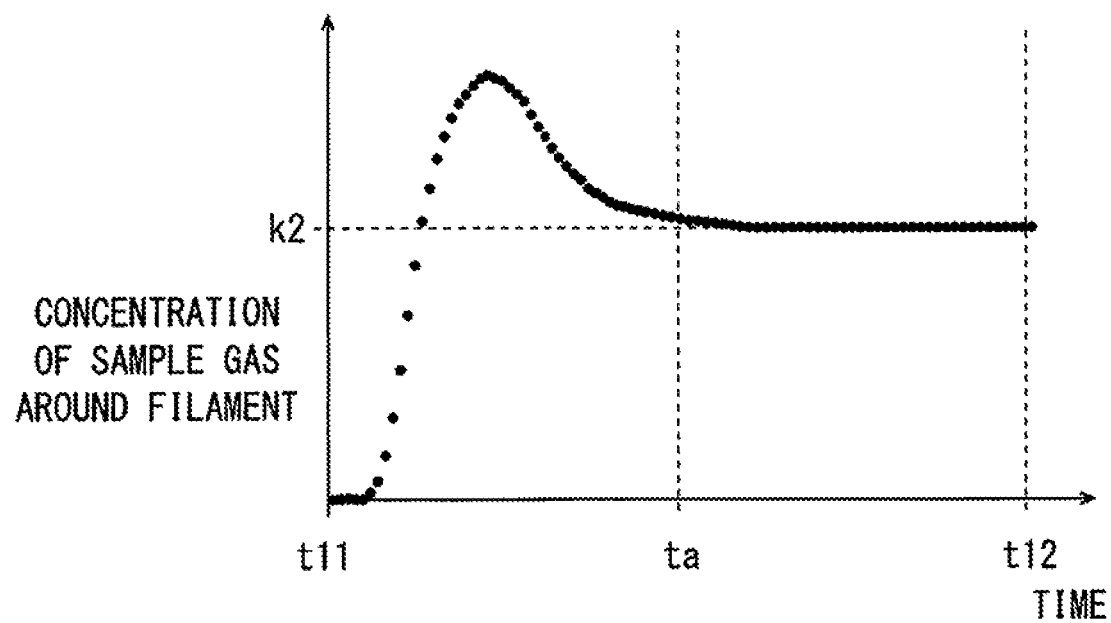

FIGS. 6A and 6B are diagrams showing the result of simulation in regard to the concentration of the sample gas that passes through the space around the filament F in each of the thermal conductivity detectors 70, 70x of the inventive example and the comparative example. The result of simulation of the inventive example is shown in FIG. 6A, and the result of simulation of the comparative example is shown in FIG. 6B. In the present embodiment, the space around the filament F is a space located at a farther downstream than the center portion of the first pipe path 71, for example.

In FIGS. 6A and 6B, the abscissa indicates the time, and the ordinate indicates the concentration of the sample gas. In the present simulation, similarly to the example of FIG. 2, the switching valve 60 is switched from the first state to the second state at a point t11 in time, and the switching valve 60 is switched to the first state at a point t12 in time.

As shown in FIG. 6A, in the result of simulation of the inventive example, the concentration of the sample gas rises from 0 after the point t11 in time and then converges at a value k1 in a relatively short period of time before the intermediate point to in time between the points t11, t12 in time. The value k1 is a value corresponding to the concentration of the sample gas led to the third pipe path 73 of the inventive example.

Meanwhile, as shown in FIG. 6B, in the result of simulation of the comparative example, the concentration of the sample gas rises from 0 after the point t11 in time, then fluctuates largely and converges at a value k2 after a predetermined period of time has elapsed from the intermediate point to in time. The value k2 is a value corresponding to the concentration of the sample gas led to the third pipe path 73 of the comparative example.

As a result, with the thermal conductivity detector 70 of the inventive example, it is found that the magnitude of overshoot of concentration of the sample gas that occurs when the switching valve 60 switches can be reduced as compared to the thermal conductivity detector 70x of the comparative example.

Further, the inventors of the present invention examined the relationship between the concentration of the sample gas and a peak area indicating a component of the sample in regard to the two chromatograms respectively obtained by the gas chromatographs 1 including the thermal conductivity detectors 70, 70x of the inventive example and the comparative example. In order to obtain an accurate amount of the sample gas over a wide range of concentration of the sample gas, it is necessary that the concentration of the sample gas led to the third pipe path 73 and the peak area of a chromatogram to have a linear relationship in a pre-allowed range.

Figure 7A:
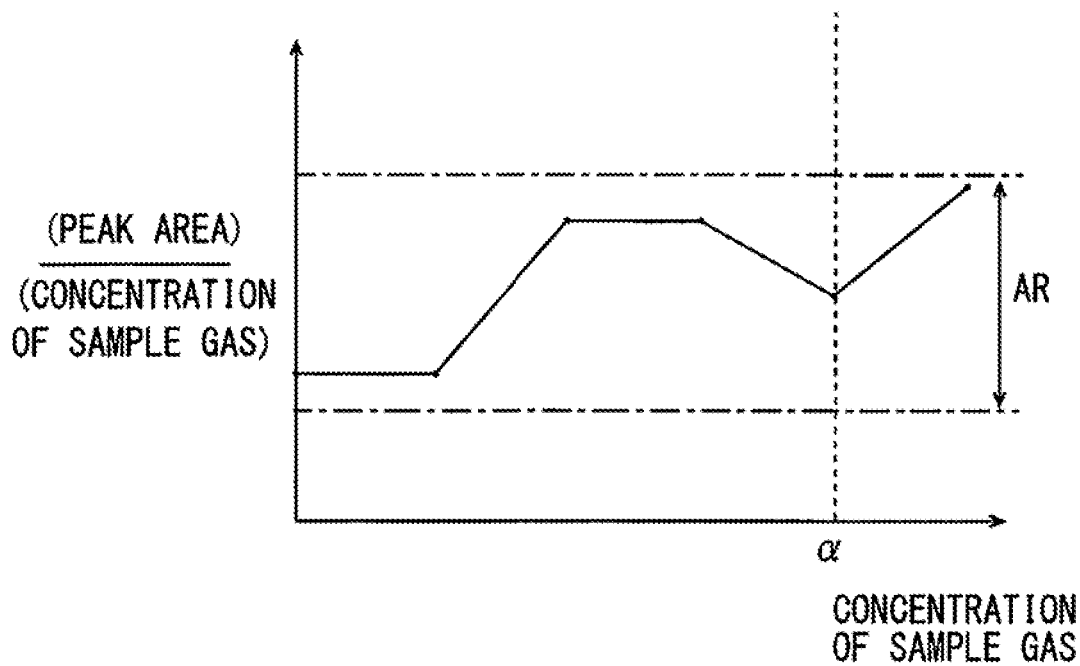
FIGS. 7A and 7B are diagrams showing the relationship between the concentration of the sample gas led to a third pipe path and a peak area indicating components of a sample in regard to chromatograms respectively obtained using the thermal conductivity detectors of the inventive example and the comparative example.
Figure 7B:
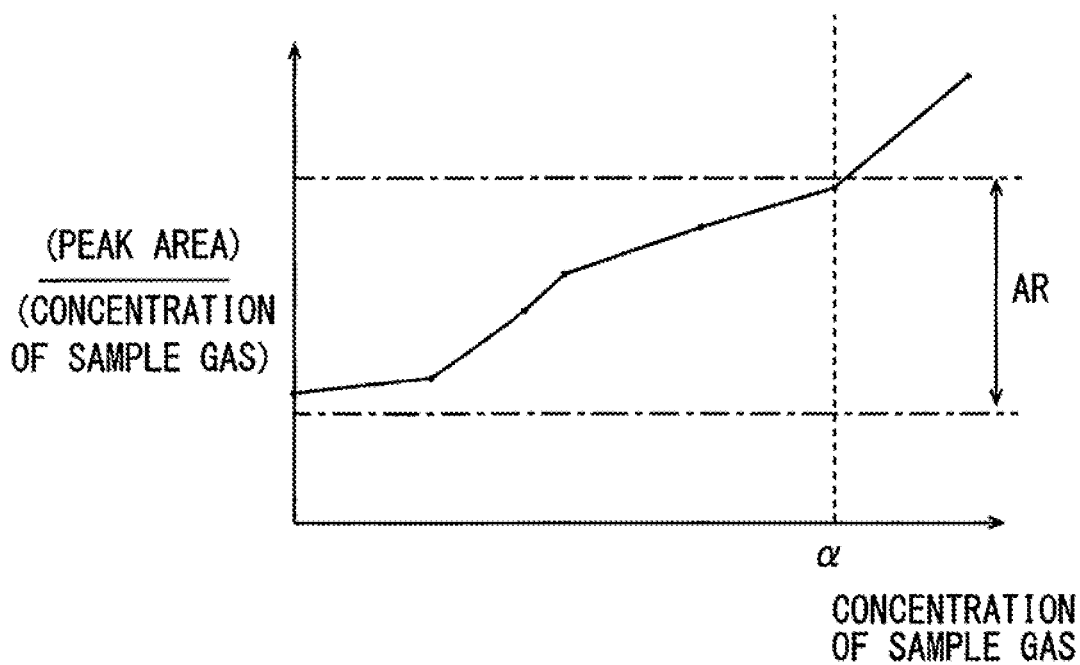

FIGS. 7A and 7B are diagrams showing the relationship between the concentration of the sample gas led to the third pipe path 73 and the peak area indicating a component of the sample in regard to the chromatograms respectively obtained with use of the thermal conductivity detectors 70, 70x of the inventive example and the comparative example.

The result of examination corresponding to the inventive example is shown in FIG. 7A, and the result of examination corresponding to the comparative example is shown in FIG. 7B. In FIGS. 7A and 7B, the abscissa indicates the concentration of the sample gas, and the ordinate indicates the ratio of the peak area of the chromatogram with respect to the concentration of the sample gas.

According to the result of examination corresponding to the inventive example of FIG. 7A, the ratio of the peak area of the chromatogram with respect to the concentration of the sample gas is in a predetermined allowable range AR over a wide range of concentration of the sample gas. Thus, it is found that the sample gas can be quantified with high accuracy over a wide range of concentration.

On the other hand, according to the result of examination corresponding to the comparative example of FIG. 7B, the ratio of the peak area of the chromatogram with respect to the concentration of the sample gas largely deviates from the allowable range AR in a range of relatively high concentration exceeding a concentration $\alpha$. It is considered that this is due to overshoot of concentration of the sample gas flowing around the filament F. Therefore, it is found that the sample gas cannot be quantified with high accuracy in the range exceeding the concentration $\alpha$.

(5) Effects

With the thermal conductivity detector 70 according to the present embodiment, the amount of the sample gas present in the space from the second gas lead-in portion 73b to the third gas lead-in portion 73c at a point in time at which the switching valve 60 switches from the first state to the second state is reduced. Thus, regardless of the concentration of the sample gas, the magnitude of overshoot in which the concentration of the sample gas flowing around the filament F increases to exceed the value corresponding to the concentration of the sample gas led to the second gas lead-in portion 73b can be reduced.

In this case, the concentration of the sample gas flowing around the filament F converges at the value corresponding to the concentration of the sample gas led to the second gas lead-in portion 73b in a short period of time after the switching valve 60 switches to the second state. Therefore, after the switching valve 60 switches to the second state, the highly credible data representing the change amount of the resistive value of the filament F can be acquired in a short period of time. Therefore, the change amount of the resistance value of the filament F can be measured with high accuracy each time the sample gas and the carrier gas flow through the first pipe path 71. As a result, a chromatogram of the sample gas can be obtained with high accuracy over a wide range of concentration.

(6) Other Embodiments (a) In the thermal conductivity detector 70 of FIGS. 3 and 4 described in the above-mentioned embodiment, the third pipe path 73 is formed to be symmetrical with respect to the second gas lead-in portion 73b. More specifically, in the axial direction of the third pipe path 73, the distance from the center of the second gas lead-in portion 73b to the one end of the third pipe path 73 is equal to the distance from the center of the second gas lead-in portion 73b to the other end of the third pipe path 73. Further, in the third pipe path 73, the distance from the center of the second gas lead-in portion 73b to the first gas lead-in portion 73a is equal to the distance from the center of the second gas lead-in portion 73b to the third gas lead-in portion 73c.

Figure 8:
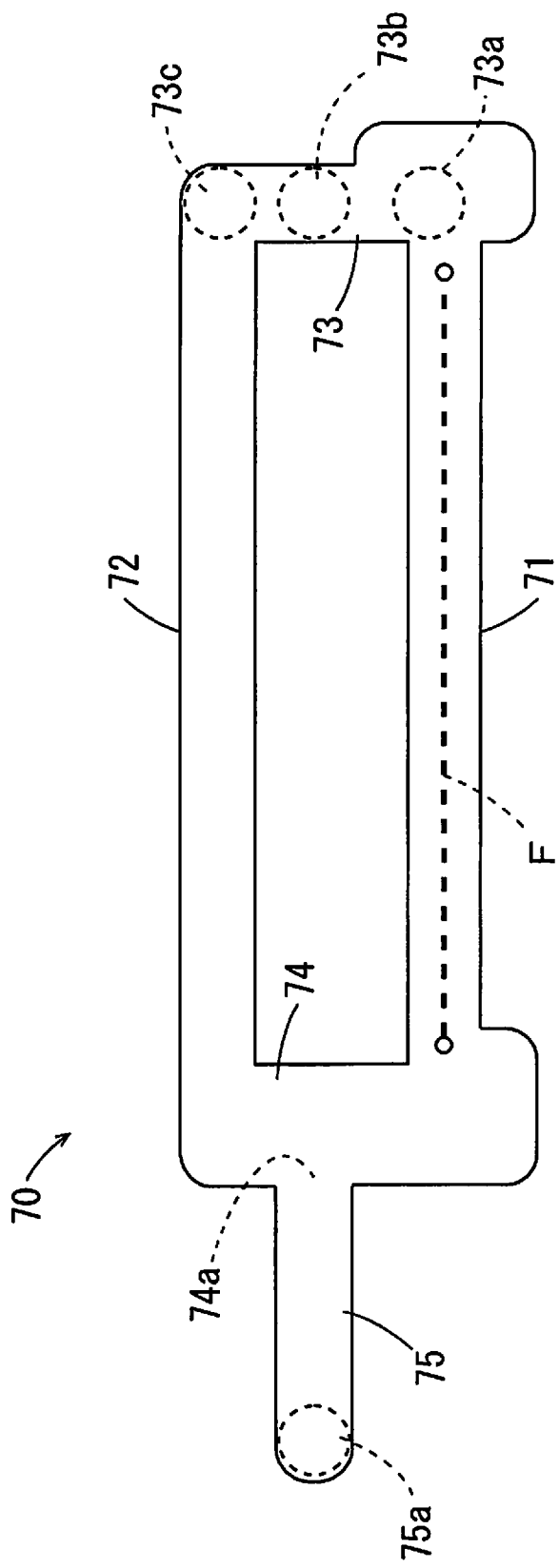
FIG. 8 is a plan view showing a plurality of pipe paths of a thermal conductivity detector according to another embodiment.

The third pipe path 73 is not limited to this example and may be formed to be asymmetrical with respect to the second gas lead-in portion 73b. FIG. 8 is a plan view showing a plurality of pipe paths of a thermal conductivity detector according to another embodiment. In the example of FIG. 8, in an axial direction of a third pipe path 73, the distance from the center of a second gas lead-in portion 73b to the one end of a third pipe path 73 is equal to the distance from the center of the second gas lead-in portion 73b to the other end of the third pipe path 73. Further, in the third pipe path 73, the distance from the center of the second gas lead-in portion 73b to a first gas lead-in portion 73a is different from the distance from the center of the second gas lead-in portion 73b to a third gas lead-in portion 73c. Even in such a case, the third pipe path 73 is configured to satisfy the above-mentioned first and second conditions, whereby the effects similar to the above-mentioned embodiment can be obtained.

(b) While each of first to fifth pipe paths 71 to 75, carrier gas lead-in pipe paths 76, 78, a sample lead-in pipe path 77 and an exhaust pipe path 79 that constitute a thermal conductivity detector 70 is formed to extend linearly in the above-mentioned embodiment, the present invention is not limited to this. Part or all of the plurality of pipe paths that constitute the thermal conductivity detector 70 may be formed to be curved.

(c) Further, while the first to fifth pipe paths 71 to 75 are formed of square pipes having a rectangular cross section in the above-mentioned embodiment, the present invention is not limited to this. Part or all of the first to fifth pipe paths 71 to 75 may be formed of a pipe having a cross section of another shape such as a circle, an oval, a triangle or a pentagon.

(d) While the filament F is used to obtain a chromatogram of the sample gas in the above-mentioned embodiment, another heat generator in which resistance changes in accordance with thermal conductivity of the sample gas may be used instead of the filament.

The invention claimed is:

1. A thermal conductivity detector for a gas chromatograph, comprising:
    a heat generator that is driven to maintain a certain temperature and in which a resistive value changes in accordance with thermal conductivity of a gas flowing around the heat generator;
    a first flow path that houses the heat generator; and
    a second flow path; and
    a third flow path that connects the first flow path to the second flow path, wherein
    first and third openings to which a carrier gas is led alternately and a second opening to which a sample gas is led are formed at the third flow path,
    the first opening, the second opening and the third opening are provided to be arranged in this order from the first flow path toward the second flow path,
    a distance between the second and third openings in the third flow path is equal to or smaller than 1.3 times of a maximum dimension of the second opening, and
    at least part of a portion between the second opening and the third opening of the third flow path has a cross sectional area equal to or smaller than an area of the second opening.

2. The thermal conductivity detector according to claim 1, further comprising a sample gas supply pipe that is provided to extend in a direction that intersects with the third flow path and leads a sample gas into the third flow path through the second opening, wherein
- a dimension of the third flow path in a direction in which the sample gas supply pipe extends is equal to or smaller than 0.5 mm.

3. A gas chromatograph comprising:
- a sample vaporizer that generates a sample gas by vaporizing a sample;
- a column that separates the sample gas generated by the sample vaporizer into components; and
- the thermal conductivity detector according to claim 1, wherein
- the thermal conductivity detector detects thermal conductivity of a sample gas of each of the components into which the sample gas is separated by the column.

4. A gas chromatograph comprising:
- a sample vaporizer that generates a sample gas by vaporizing a sample;
- a column that separates the sample gas generated by the sample vaporizer into components; and
- the thermal conductivity detector according to claim 2, wherein
- the thermal conductivity detector detects thermal conductivity of a sample gas of each of the components into which the sample gas is separated by the column.

* * * * *